United States Patent
Yamamura et al.

(10) Patent No.: US 11,154,961 B2
(45) Date of Patent: Oct. 26, 2021

(54) CORRECTION OF FABRICATED SHAPES IN ADDITIVE MANUFACTURING

(71) Applicant: Applied Materials, Inc., Santa Clara, CA (US)

(72) Inventors: Mayu Felicia Yamamura, San Carlos, CA (US); Jason Garcheung Fung, Santa Clara, CA (US); Daniel Redfield, Morgan Hill, CA (US); Rajeev Bajaj, Fremont, CA (US); Hou T. Ng, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/737,818

(22) Filed: Jan. 8, 2020

(65) Prior Publication Data
US 2020/0139507 A1    May 7, 2020

Related U.S. Application Data

(63) Continuation of application No. 15/455,072, filed on Mar. 9, 2017, now Pat. No. 10,537,973.
(Continued)

(51) Int. Cl.
*B24B 37/26* (2012.01)
*B24D 18/00* (2006.01)
(Continued)

(52) U.S. Cl.
CPC .............. *B24B 37/26* (2013.01); *B24B 37/20* (2013.01); *B24D 18/009* (2013.01);
(Continued)

(58) Field of Classification Search
CPC ....... B24B 37/20; B24B 37/26; B24D 18/009; B29C 64/112; B29C 64/165;
(Continued)

(56) References Cited

U.S. PATENT DOCUMENTS

| 5,257,478 A | 11/1993 | Hyde et al. |
| 5,387,380 A | 2/1995 | Cima et al. |

(Continued)

FOREIGN PATENT DOCUMENTS

| DE | 19834559 | 2/2000 |
| EP | 1512519 | 3/2005 |

(Continued)

OTHER PUBLICATIONS

TW Office Action in Taiwanese Application No. 106107697, dated Sep. 17, 2020, 6 pages (with English summary).
(Continued)

*Primary Examiner* — Kidest Bahta
(74) *Attorney, Agent, or Firm* — Fish & Richardson P.C.

(57) ABSTRACT

A method of fabricating a polishing pad using an additive manufacturing system includes receiving data indicative of a desired shape of the polishing pad to be fabricated by droplet ejection. The desired shape defines a profile including a polishing surface and one or more grooves on the polishing pad. Data indicative of a modified pattern of dispensing feed material is generated to at least partially compensate for distortions of the profile caused by the additive manufacturing system, and a plurality of layers of the feed material are dispensed by droplet ejection in accordance to the modified pattern.

20 Claims, 10 Drawing Sheets

Related U.S. Application Data

(60) Provisional application No. 62/305,973, filed on Mar. 9, 2016.

(51) Int. Cl.
*B29C 64/393* (2017.01)
*B29C 64/112* (2017.01)
*B29C 64/165* (2017.01)
*B33Y 10/00* (2015.01)
*B33Y 30/00* (2015.01)
*B33Y 50/02* (2015.01)
*B33Y 80/00* (2015.01)
*B24B 37/20* (2012.01)
*B29L 31/00* (2006.01)

(52) U.S. Cl.
CPC .......... *B29C 64/112* (2017.08); *B29C 64/165* (2017.08); *B29C 64/393* (2017.08); *B33Y 10/00* (2014.12); *B33Y 30/00* (2014.12); *B33Y 50/02* (2014.12); *B33Y 80/00* (2014.12); *B29L 2031/736* (2013.01)

(58) Field of Classification Search
CPC . B29C 64/393; B29L 2031/736; B33Y 10/00; B33Y 30/00; B33Y 50/02; B33Y 80/00
See application file for complete search history.

(56) References Cited

U.S. PATENT DOCUMENTS

| | | | |
|---|---|---|---|
| 5,738,574 | A * | 4/1998 | Tolles ................ B08B 1/007 451/288 |
| 5,900,164 | A | 5/1999 | Budinger et al. |
| 5,906,863 | A | 5/1999 | Lombardi et al. |
| 5,921,855 | A | 7/1999 | Osterheld et al. |
| 5,932,290 | A | 8/1999 | Lombardi et al. |
| 5,940,674 | A | 8/1999 | Sachs et al. |
| 6,423,255 | B1 | 7/2002 | Hoechsmann et al. |
| 6,875,097 | B2 | 4/2005 | Grundwald |
| 7,524,345 | B2 | 4/2009 | Nevoret et al. |
| 7,531,117 | B2 | 5/2009 | Ederer et al. |
| 9,031,680 | B2 | 5/2015 | Napadensky |
| 9,067,299 | B2 | 6/2015 | Bajaj |
| 9,073,260 | B2 | 7/2015 | El-Siblani et al. |
| 9,073,261 | B2 | 7/2015 | El-Siblani et al. |
| 9,073,262 | B2 | 7/2015 | El-Siblani et al. |
| 9,079,355 | B2 | 7/2015 | El-Siblani et al. |
| 9,421,666 | B2 | 8/2016 | Krishnan |
| 9,457,520 | B2 | 10/2016 | Bajaj |
| 9,542,525 | B2 | 1/2017 | Arisoy et al. |
| 9,662,840 | B1 | 5/2017 | Buller et al. |
| 9,744,724 | B2 | 8/2017 | Bajaj et al. |
| 2001/0003004 | A1 | 6/2001 | Leyden et al. |
| 2001/0020448 | A1 | 9/2001 | Vaartstra et al. |
| 2002/0111707 | A1 | 8/2002 | Li |
| 2004/0154533 | A1 | 8/2004 | Agarwal et al. |
| 2005/0012247 | A1 | 1/2005 | Kramer |
| 2005/0049739 | A1 | 3/2005 | Kramer |
| 2005/0074596 | A1 | 4/2005 | Nielsen et al. |
| 2005/0110853 | A1 | 5/2005 | Gardner et al. |
| 2005/0248065 | A1 | 11/2005 | Owada |
| 2005/0278056 | A1 | 12/2005 | Farnworth |
| 2006/0019587 | A1 | 1/2006 | Deopura et al. |
| 2006/0099287 | A1 | 5/2006 | Kim |
| 2006/0111807 | A1 | 5/2006 | Gothait |
| 2006/0160478 | A1 | 7/2006 | Donohue et al. |
| 2006/0192315 | A1 | 8/2006 | Farr et al. |
| 2007/0128991 | A1 | 6/2007 | Yoon et al. |
| 2007/0212979 | A1 | 9/2007 | Preston |
| 2007/0235904 | A1 | 10/2007 | Saikin |
| 2007/0249070 | A1 | 10/2007 | Brodsky et al. |
| 2008/0157436 | A1 | 7/2008 | Patel et al. |
| 2009/0321979 | A1 | 12/2009 | Hiraide |
| 2010/0191360 | A1 | 7/2010 | Napadensky |
| 2010/0323050 | A1 | 12/2010 | Kumagai et al. |
| 2011/0059247 | A1 | 3/2011 | Kuzusako et al. |
| 2012/0282849 | A1 | 11/2012 | Kerprich et al. |
| 2013/0017764 | A1 | 1/2013 | Allison et al. |
| 2013/0027458 | A1 | 1/2013 | Sirringhaus et al. |
| 2013/0283700 | A1 * | 10/2013 | Bajaj ................. B24B 37/26 51/295 |
| 2014/0107823 | A1 | 4/2014 | Huang |
| 2014/0206268 | A1 | 7/2014 | Lefevre et al. |
| 2014/0324206 | A1 | 10/2014 | Napadensky |
| 2015/0044951 | A1 | 2/2015 | Bajaj et al. |
| 2015/0111476 | A1 | 4/2015 | Tsai et al. |
| 2015/0126099 | A1 | 5/2015 | Krishnan et al. |
| 2015/0174826 | A1 * | 6/2015 | Murugesh ............ B24B 37/24 264/425 |
| 2016/0023403 | A1 | 1/2016 | Ramos et al. |
| 2016/0082666 | A1 * | 3/2016 | de Pena ............ G05B 19/4099 700/98 |
| 2016/0107287 | A1 | 4/2016 | Bajaj et al. |
| 2016/0107290 | A1 | 4/2016 | Bajaj et al. |
| 2016/0144563 | A1 | 5/2016 | Elliot |
| 2017/0165922 | A1 | 6/2017 | Hakkaku |
| 2017/0259396 | A1 | 9/2017 | Yamamura et al. |
| 2017/0355140 | A1 | 12/2017 | Bajaj et al. |
| 2018/0086006 | A1 | 3/2018 | Proctor et al. |
| 2018/0339397 | A1 | 11/2018 | Redfield |
| 2018/0339401 | A1 | 11/2018 | Redfield et al. |
| 2018/0339402 | A1 | 11/2018 | Redfield et al. |
| 2018/0339447 | A1 | 11/2018 | Redfield |
| 2019/0084220 | A1 | 3/2019 | Ochi et al. |

FOREIGN PATENT DOCUMENTS

| | | |
|---|---|---|
| EP | 1661690 | 5/2006 |
| EP | 2277686 | 1/2011 |
| EP | 2431157 | 3/2012 |
| EP | 2952332 | 12/2015 |
| JP | H9-50974 | 2/1997 |
| JP | 2002-28849 | 1/2002 |
| JP | 2006-95680 | 4/2006 |
| JP | 2008-507417 | 3/2008 |
| JP | 2008-531306 | 8/2008 |
| JP | 2011-67946 | 4/2011 |
| JP | 5463653 | 4/2014 |
| JP | 2015-517922 | 6/2015 |
| KR | 10-2005-0052876 | 6/2005 |
| KR | 10-2008-0038607 | 5/2008 |
| KR | 10-2013-0014782 | 2/2013 |
| TW | 201234466 | 8/2012 |
| WO | WO 01/64396 | 9/2001 |
| WO | WO 02/24415 | 3/2002 |
| WO | WO 2013/128452 | 9/2013 |
| WO | WO 2015/065793 | 5/2015 |
| WO | WO 2015/105047 | 7/2015 |
| WO | WO 2016/060712 | 4/2016 |
| WO | WO 2016/061544 | 4/2016 |

OTHER PUBLICATIONS

TW Office Action in Taiwanese Application No. 106107697, dated Apr. 29, 2020, 11 pages (with English search report).
'Wikipedia' [online]. "3D printing," 2013, [retrieved on Feb. 25, 2013]. Retrieved from the Internet: URL:http://en.wikipedia.org/wiki/3D_printing 17 pages.
Cook, "CMP Consumables II: Pad," Semiconductors and Semimetals, 2000, 155-181.
Desai et al., "Effect of Polishing Pad Material Properties on Chemical Mechanical Polishing (CMP) Processes," Center for Polymer Research, University of Texas, Austin, TX 78712, 1994, 8 pages.
Extended European Search Report in EP Appln. No. 17764154.5, dated Oct. 17, 2019, 8 pages.
International Preliminary Report on Patentability in International Application No. PCT/US2017/021686, dated Sep. 11, 2018, 5 pages.
International Search Report and Written Opinion in International Application No. PCT/US2017/021686, dated Jun. 20, 2017, 9 pages.

(56) References Cited

OTHER PUBLICATIONS

International Search Report and Written Opinion in International Application No. PCT/US2018/034699, dated Sep. 19, 2018, 22 pages.
Jun et al., "Slicing Bitmap Generation and Patterning technique a SFF System Using UV-resin," International Conference on Control, Automation and Systems (2007).
Krober et al., "Reactive inkjet printing of polyurethanes," Journal of Materials Chemistry 19:5234-5238 (2009).
Rodel, Rodel IC1000 CMP Pad, 1999, 2 pages.
Van den Berg et al., "Inkjet printing of polyurethane colloidal suspensions," Soft Matter 3:238-243 (2007).
Yang et al., "High Viscosity Jetting System Fabrication for 3D Reactive Inkjet Printing," Twenty Forth Annual International Solid Freeform Fabrication Symposium (2013), pp. 505-513.
KR Office Action in Korean Appln No. 10-2018-7025981, dated Feb. 15, 2021. 18 pages (with English translation).
JP Office Action in Japanese Appln. No. 2018-546662, dated Apr. 17, 2021, 5 pages (with English translation).

* cited by examiner

CORRECTION OF FABRICATED SHAPES IN ADDITIVE MANUFACTURING

CROSS-REFERENCE TO RELATED APPLICATIONS

This application is a continuation of U.S. patent application Ser. No. 15/455,072, filed Mar. 9, 2017, which claims priority to U.S. Provisional Application Ser. No. 62/305,973, filed Mar. 9, 2016, the disclosures of which are incorporated by reference.

TECHNICAL FIELD

This specification relates to additive manufacturing.

BACKGROUND

An integrated circuit is typically formed on a substrate by the sequential deposition of conductive, semiconductive, or insulative layers on a silicon wafer. A variety of fabrication processes require planarization of a layer on the substrate. For certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("overpolishing") or too little material removed ("underpolishing"). In addition to planarization, polishing pads can be used for finishing operations such as buffing.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

SUMMARY

In one aspect, a method of fabricating a polishing pad using an additive manufacturing system includes receiving data indicative of a desired shape of the polishing pad to be fabricated by droplet ejection. The desired shape defines a profile including a polishing surface and one or more grooves on the polishing pad. Data indicative of a modified pattern of dispensing feed material is generated to at least partially compensate for distortions of the profile caused by the additive manufacturing system, and a plurality of layers of the feed material are dispensed by droplet ejection in accordance to the modified pattern.

In another aspect, a method of fabricating an object using an additive manufacturing system includes receiving data indicative of a desired shape of the object to be fabricated by droplet ejection. The desired shape defines a profile including a top surface and one or more recesses. Data indicative of a modified pattern of dispensing feed material is generated to at least partially compensate for distortions of the profile caused by the additive manufacturing system, and a plurality of layers of the feed material are dispensed by droplet ejection in accordance to the modified pattern.

In another aspect, a computer program product, tangibly embodied in a computer readable medium, includes instructions to cause a processor to receive data indicative of a desired shape of a polishing pad to be fabricated by droplet ejection in an additive manufacturing system. The desired shape defines a profile including a polishing surface and one or more grooves on the polishing pad. Data is generated indicative of a modified pattern of dispensing feed material to at least partially compensate for distortions of the profile caused by the additive manufacturing system, and the additive manufacturing system is caused to dispense a plurality of layers of the feed material by droplet ejection in accordance to the modified pattern.

In another aspect, a computer program product, tangibly embodied in a computer readable medium, includes instructions to cause a processor to receive data indicative of a desired shape of an object to be fabricated by droplet ejection in an additive manufacturing system. The desired shape defines a profile including a top surface and one or more recesses. Data is generated indicative of a modified pattern of dispensing feed material to at least partially compensate for distortions of the profile caused by the additive manufacturing system, and the additive manufacturing system is caused to dispense a plurality of layers of the feed material by droplet ejection in accordance to the modified pattern.

In another aspect, an additive manufacturing system includes a platform to hold a polishing pad being fabricated, a printhead to form a plurality of layer by ejecting droplets onto the platform or a previously deposited layer of the polishing pad, and a controller configured to receive data indicative of a desired shape of the polishing pad, the desired shape defining a profile including a polishing surface and one or more grooves on the polishing pad, generate data indicative of a modified pattern of dispensing feed material to at least partially compensate for distortions of the profile caused by the additive manufacturing system, and cause the printhead to dispense a plurality of layers of the feed material by droplet ejection in accordance to the modified pattern.

In another aspect, an additive manufacturing system includes a platform to hold a polishing pad being fabricated, a printhead to form a plurality of layer by ejecting droplets onto the platform or a previously deposited layer of the polishing pad, and a controller configured to receive data indicative of a desired shape of the polishing pad, the desired shape defining a profile including a polishing surface and one or more grooves on the polishing pad, generate data indicative of a modified pattern of dispensing feed material to at least partially compensate for distortions of the profile caused by the additive manufacturing system, and cause the printhead to dispense a plurality of layers of the feed material by droplet ejection in accordance to the modified pattern.

Implementations may include one or more of the following features.

The one or more grooves on the polishing pad may be defined by a side wall substantially perpendicular to the plurality of layers. The distortions of the one or more grooves may include distortions of a perpendicularity of the side wall to the polishing surface.

The polishing surface may be substantially parallel to the plurality of layers. The modified pattern may be configured to at least partially compensate for distortions of the polishing surface of the polishing pad caused by the additive manufacturing system. The distortions of the polishing surface of the polishing pad may include distortions of a planarity of the polishing surface.

The data indicative of the desired shape of the polishing pad may include data indicative of a pattern of dispensing a plurality of layers of feed material, the data indicative of the pattern including data representing a planar top surface. The data indicative of the modified pattern may include data representing a concave top surface generated based on the data representing the planar top surface. The data representing the concave top surface may be generated to at least partially compensate for distortions of a planarity of a polishing surface of the polishing pad formed using the data indicative of the pattern.

Generating the data indicative of the modified pattern may include modifying data indicative of an original pattern to form the desired shape of the polishing pad. The data indicative of the original pattern may be modified based on a correction profile to the original pattern. The correction profile may include a portion extending beyond a width of the original pattern. The correction profile may be determined by identifying a difference between an original shape and the desired shape, the original shape being defined at least in part by the distortions. Modifying the data indicative of the original pattern may include modifying an amount of the feed material deposited per voxel.

The polishing surface may include a partition separating at least two grooves, and modifying the data indicative of the original pattern may include determining a first volume of material dispensed proximate an edge portion of the partition adjacent the groove, determining a second volume of material dispensed in a central portion of the partition, and modifying a distribution of volume of the feed material based on the first volume and the second volume such that the second volume is greater than the first volume.

The distortions of the profile caused by the additive manufacturing apparatus may include distortions caused by flow of ejected droplets on features being fabricated. The distortions of the profile may include distortions of a height of the one or more grooves. The desired shape of the polishing pad include a planar surface defining the polishing surface, and the modified pattern may include a nonplanar portion corresponding to the planar surface. The nonplanar portion may be configured to at least partially compensate for distortions of the polishing surface caused by the additive manufacturing system.

Advantages of the foregoing may include, but are not limited to, the following. The geometry of a polishing pad can be more precisely controlled, thereby improving polishing efficacy of the polishing pad. Furthermore, a correction profile can compensate for potential distortions by adjusting data that the additive manufacturing apparatus uses to form an article, e.g., a polishing pad, rather than removing material after the article has been initially formed. The amount of post-processing of the article after it is formed by the additive manufacturing apparatus can be decreased. As a result, an amount of feed material waste can be reduced, and yield and throughput can be increased.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

An additive manufacturing apparatus can be used to form a polishing pad. The additive manufacturing apparatus can be provided with an initial pattern to dispense feed material. The initial pattern corresponds to a desired shape of the polishing pad to be formed. When the polishing pad is formed by the additive manufacturing apparatus using the initial pattern, an actual shape of the polishing pad may include distortions relative to the desired shape of the polishing pad. As described herein, the initial pattern provided to the additive manufacturing apparatus can be modified by a correction profile to generate a modified pattern to at least partially compensate for these distortions. The resulting shape formed using the modified pattern can thus more closely match the desired shape of the polishing pad.

Figure 1:
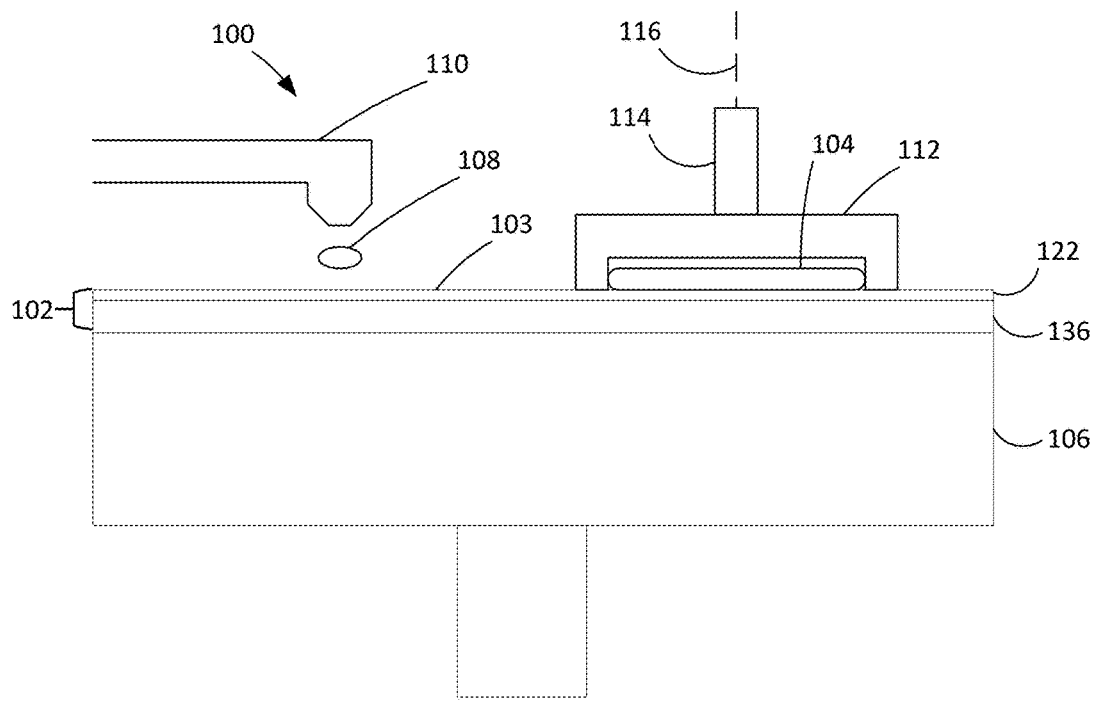
FIG. 1 is a schematic side view of a polishing system.

Turning now to FIG. 1, a polishing system 100 includes a polishing pad 102 that can be used to polish one or more substrates 104. A description of a suitable polishing apparatus can be found in U.S. Pat. No. 5,738,574, the entire disclosure of which is incorporated herein by reference. The polishing system 100 can include a rotatable platen 106 on which the polishing pad 102 is placed. During a polishing step, a polishing liquid 108, e.g., abrasive slurry, can be supplied to a polishing surface 103 of polishing pad 102 by a slurry supply port or combined slurry/rinse arm 110. The polishing liquid 108 can contain abrasive particles, a pH adjuster, or chemically active components.

The substrate 104 is held against the polishing pad 102 by a carrier head 112. The carrier head 112 is suspended from a support structure, such as a carousel, and is connected by a carrier drive shaft 114 to a carrier head rotation motor so that the carrier head can rotate about an axis 116. The relative motion of the polishing pad 102 and the substrate 104 in the presence of the polishing liquid 108 results in polishing of the substrate 104.

Figure 2:
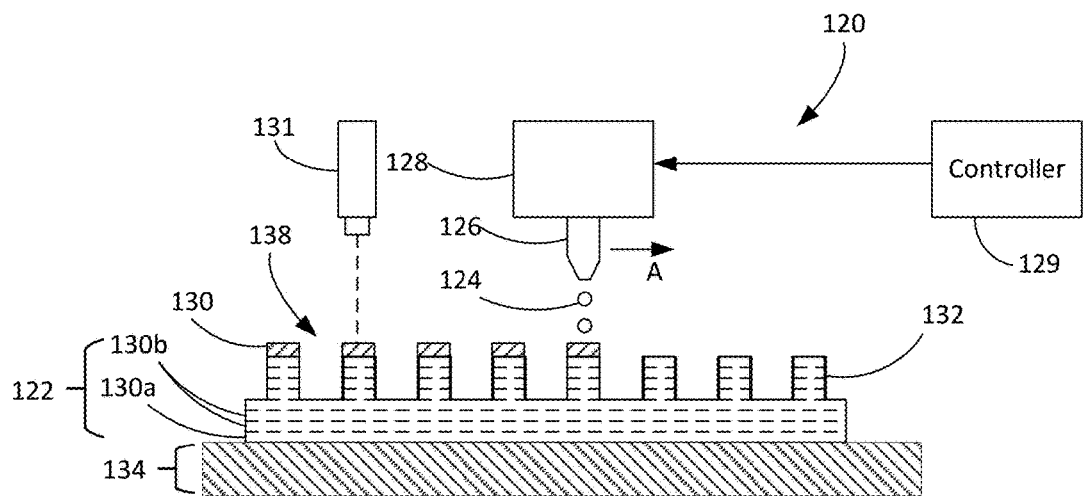
FIG. 2 is a schematic side view of an additive manufacturing apparatus.

Referring to FIG. 2, in some examples, an additive manufacturing apparatus 120 that dispenses successive layers of feed material can be used to form the polishing pad 102. Referring to FIGS. 1 and 2, the additive manufacturing apparatus 120 is operated to form at least a polishing layer 122 of the polishing pad 102. In the manufacturing process, thin layers of feed material are progressively dispensed and cured. For example, droplets 124 of feed material, e.g., polishing pad precursor material, can be ejected from a nozzle 126 of a dispenser 128, e.g., a droplet ejector printer, to form a layer 130 of the feed material. The dispenser 128 is similar to an inkjet printer, but uses the feed material for forming the polishing pad 102 rather than ink.

A controller 129 is operable to control dispensing operations of the dispenser 128 and, if applicable, control curing operations using an energy source 131 such as a lamp or a laser. The nozzle 126 is translated (shown by arrow A) across a support 134 to dispense feed material at any portion of a build area on the support 134.

In some implementations, the energy source 131 trails the nozzle 126 as the nozzle 126 is translated across the support 134, such that feed material dispensed through the nozzle 126 can be immediately cured. In some implementations, the energy source 131 leads the nozzle 126 as the nozzle 126 is translated across the support 134 in a first scanning direction while dispensing feed material. The energy source 131 can cure this dispensed feed material as the energy source 131 is scanned across the support 134, e.g., in a second scanning direction opposite the first scanning direction, thereby providing the feed material additional time to reach a stable state before being exposed to radiation of the energy source 131. In some implementations, the energy source 131 leads the nozzle 126 as the nozzle 126 is translated across the support 134 in a first scanning direction, and the energy source 131 is used to cure the dispensed feed material as the energy source is scanned in the first scanning direction. Thus, the previously dispensed layer of feed material can be cured almost immediately before another layer is dispensed through the nozzle 126. In some implementations, there are multiple energy sources, with an energy source 131 trails the nozzle 126 and an energy source 131 that leads the nozzle 126.

For a first layer 130a deposited, the nozzle 126 can eject the feed material onto the support 134. For subsequently deposited layers 130b, the nozzle 126 can eject onto already solidified feed material 132. After each layer 130 is solidified, a new layer is then deposited over the previously deposited layer until the full 3-dimensional polishing layer 122 is fabricated. Each layer is applied by the nozzle 126 in a pattern stored in a 3D drawing computer program that runs on a computer 60. Each layer 130 is less than 50% of the total thickness of the polishing layer 122, e.g., less than 10%, e.g., less than 5%, e.g., less than 1%.

The polishing layer 122 can be formed on a support 134. In some examples, the support 134 includes a rigid base, or includes a flexible film, e.g., a layer of polytetrafluoroethylene (PTFE). If the support 134 includes a flexible film, then the support 134 forms a portion of the polishing pad 102. For example, the support 134 can include a backing layer 136 (shown in FIG. 1) of the polishing pad 102 or a layer between the backing layer and the polishing layer 122. If the support 134 includes the backing layer 136 of the polishing pad 102, the support 134 is not removed from the polishing pad 102 after manufacturing of the polishing pad 102 is complete. Referring to FIG. 1, the polishing pad 102 is mounted to the polishing system 100 with the backing layer 136 (e.g., the support 134) facing the rotatable platen 106. Alternatively, if the support 134 does not include the backing layer 136 of the polishing pad 102, the polishing layer 122 can be removed from the support 134 after manufacturing of the polishing pad 102 is complete.

Solidification of the layers 130 of feed material can be accomplished by polymerization. For example, the layer 130 of feed material can be a monomer, and the monomer can be polymerized in-situ by ultraviolet (UV) curing. The feed material can be cured effectively immediately upon deposition, or an entire layer 130 of pad precursor material can be deposited and then the entire layer 130 be cured simultaneously. Alternatively, the droplets 124 can be a polymer melt that solidifies upon cooling. In further implementations, the apparatus 120 creates the polishing layer 122 by spreading a layer of powder and ejecting droplets of a binder material onto the layer of powder. In this case, the powder could include additives, e.g., abrasive particles.

In some implementations, the backing layer 136 can also be fabricated by a 3D printing process. For example, the backing layer 136 and polishing layer 122 could be fabricated in an uninterrupted operation by the apparatus 120. The backing layer 136 can be provided with a different hardness than the polishing layer 122 by using a different amount of curing, e.g., a different intensity of UV radiation, or by using a different material. In other implementations, the backing layer 136 is fabricated by a conventional process and then secured to the polishing layer 122. For example, the polishing layer 122 can be secured to the backing layer 136 by a thin adhesive layer, e.g., as a pressure-sensitive adhesive.

Figure 3A:
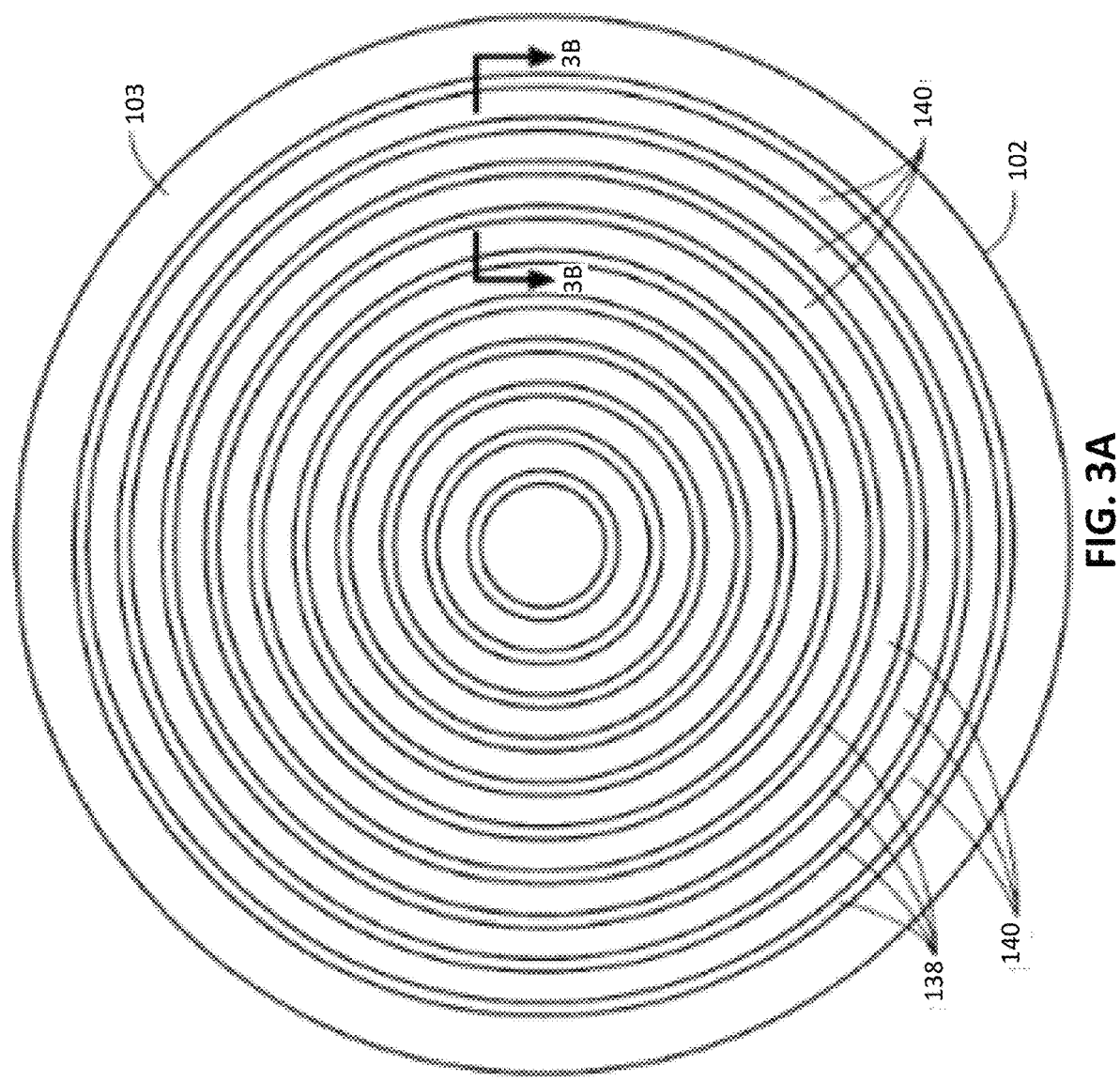
FIG. 3A is a top view of an example of a polishing pad.
Figure 3B:
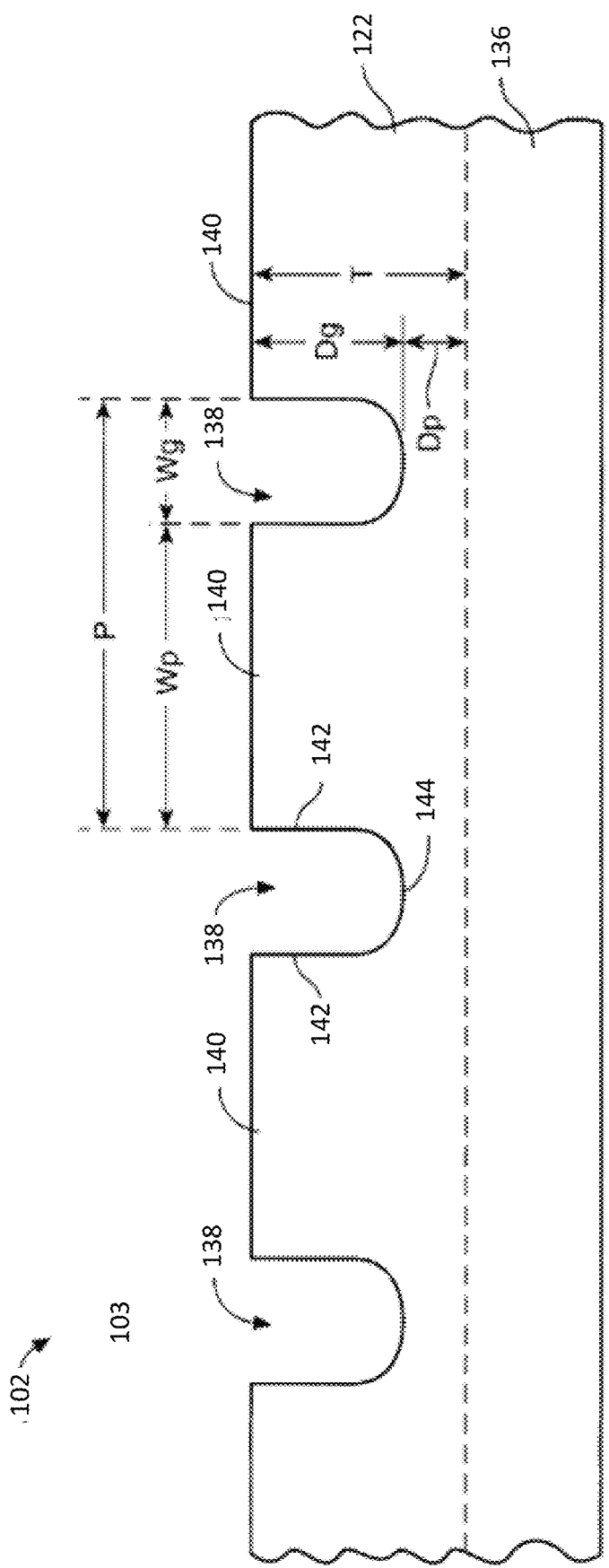
FIG. 3B is a side view of the polishing pad of FIG. 3A.

In some implementations, referring to FIGS. 2, 3A, and 3B, when the polishing layer 122 is formed, the apparatus 120 can selectively dispense and/or selectively cure portions of the feed material to form grooves 138 in the polishing layer 122. The grooves 138 can carry the polishing liquid 108 (shown in FIG. 1). The grooves 138 may be of nearly any pattern, such as concentric circles, straight lines, cross-hatching, spirals, and the like. Assuming grooves are present, partitions 140 between the grooves 138 define the polishing surface 103. The polishing surface 103, e.g., including the partitions 140 between the grooves 138, can be about 25-90%, e.g., 70-90%, of the total horizontal surface area of the polishing pad 102. Thus, the grooves 138 can occupy 10%-75%, e.g., 10-30%, of the total horizontal surface area of the polishing pad 102. The partitions between the grooves 138 can have a lateral width of about 0.1 to 2.5 mm.

Referring to examples illustrated in FIGS. 3A and 3B, in some implementations, the grooves 138 include concentric circular grooves. These grooves 138 can be uniformly spaced with a pitch P. The pitch P is the radial distance between adjacent grooves 138. The partitions 140 between the grooves 138 have a width $W_p$. Each groove 138 are defined by side walls 142 extending from a bottom surface 144 of the groove 138 and terminate in at the polishing surface 103, e.g., at the partition 140. Each groove 138 may have a depth $D_g$ and a width $W_g$.

The side walls 142 can extend downwardly from and be generally perpendicular to the polishing surface 103. In this regard, the side walls are substantially perpendicular to the layers 130 of feed material dispensed on the support 134. In addition, the partitions 140 extend substantially parallel to the layers 130 of feed material dispensed on the support 134.

Each polishing cycle results in wear of polishing pad 102, generally in the form of thinning of the polishing pad 102 as the polishing surface 103 is worn down. The width $W_g$ of a groove with substantially perpendicular side walls 142 does not change as the polishing pad is worn. Thus, the generally perpendicular side walls 142 ensure that the polishing pad 102 has a substantially uniform surface area over its operating lifetime. As described herein, the manufacturing process to form the polishing pad 102 can include compensatory operations to prevent the polishing surface 103 from being nonplanar, e.g., to ensure planarity or flatness of the polishing surface 103, and to fabricate the side walls 142 as perpendicular to the polishing surface 103.

The grooves 138 can have a minimum width $W_g$ of about 0.34 mm. Each groove 138 can have a width $W_g$ between 0.34 mm and 2.71 mm, e.g., between about 0.38 mm and 1.02 mm. Specifically, the grooves 138 may have a width $W_g$ of approximately 0.51 mm or 0.68 mm. The pitch P between the grooves 138 may be between about 0.68 and 6.10 mm, e.g., between about 2.29 mm and 5.40 mm. Specifically, the pitch may be approximately 2.03 or 3.05 mm. Each partition 140 between the grooves 138 may have a width $W_p$ of at least 0.34 mm. The ratio of groove width $W_g$ to partition width $W_p$ may be selected to be between about 0.10 and 0.4. The ratio may be approximately 0.2 or 0.3.

In some implementations, if the polishing pad 102 includes the backing layer 136, the grooves 138 can extend entirely through the polishing layer 122. In some implementations, the grooves 138 can extend through about 20-80%, e.g., 40%, of the thickness of the polishing layer 122. The depth $D_g$ of the grooves 138 can be 0.25 to 1 mm. The polishing layer 122 can have a thickness T between about 1 mm and 3 mm. The thickness T should be selected so that the distance $D_p$ between the bottom surface 144 of the groove 138 and the backing layer 136 is between about 0.5 mm and 4 mm. Specifically, the distance $D_p$ may be about 1 or 2 mm.

Figure 4:
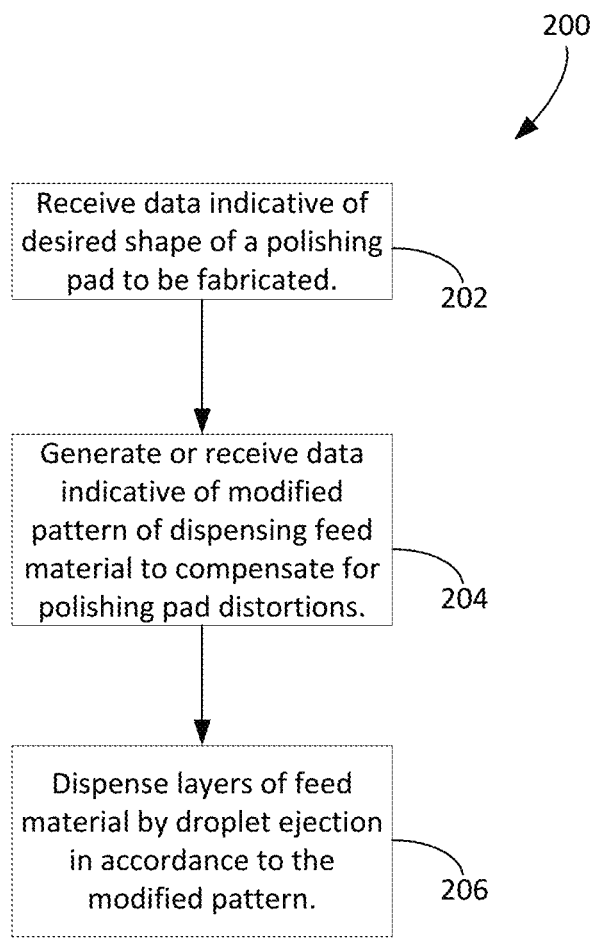
FIG. 4 is a flowchart of a process to form an article.

Referring to FIG. 4, a manufacturing process 200 to form the polishing pad 102 is illustrated. For example, the additive manufacturing apparatus 120, including the controller 129, can perform the operations of the manufacturing process 200.

At operation 202, data indicative of a desired shape of the polishing pad 102 to be fabricated is received. Data indicative of shapes, including the data indicative of the desired shape, can be defined by a two-dimensional or three-dimensional bitmap. In some implementations, the shape data includes data representing a computer-aided design (CAD) model. For example, if the shape data corresponds to the data indicative of the desired shape, the CAD model is representative of the polishing pad 102 to be fabricated.

Figure 5:
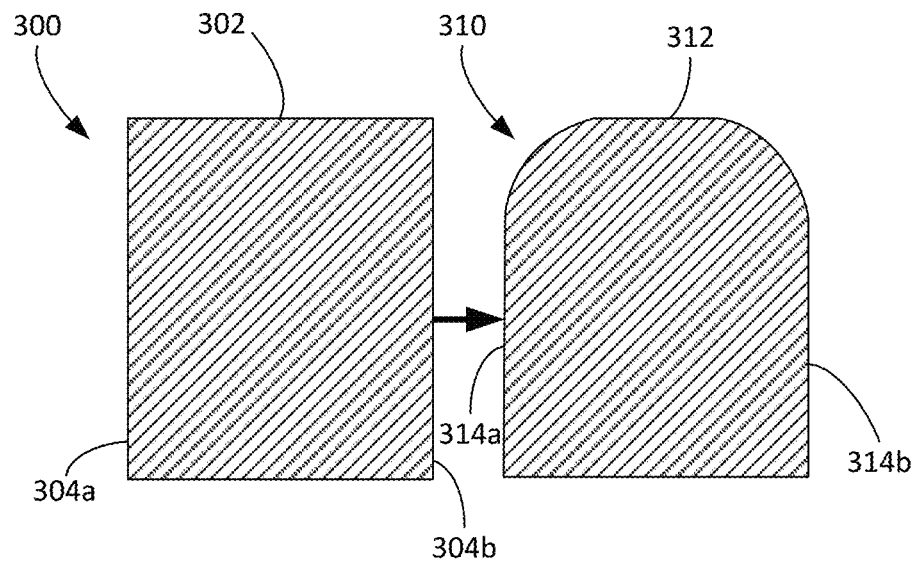
FIG. 5 illustrates an example of an actual shape formed based on a desired shape.

In some examples, referring to FIG. 5, the desired shape includes a desired feature 300. Absent further manipulation of the data indicative of the desired shape, when the additive manufacturing apparatus 120 forms the desired shape, e.g., dispenses the feed material and cures or allows the feed material to cure to form the desired shape, an actual feature 310 may be formed based on the data indicative of the desired shape including the desired feature 300. For example, to form the rectangular desired feature 300, the dispenser 128 is controlled to dispense parallel layers 130 of feed material. For each layer, a selected portion of feed material having a uniform width corresponding to a width of the rectangular desired feature 300 is cured.

During this dispensing and curing process, material properties and resolution of the additive manufacturing apparatus 120 can cause edges of the actual feature 310 to become undesirably rounded or beveled. In particular, if the layers 130 of feed material are dispensed in accordance to an original pattern determined based on the data indicative of the desired shape, the resulting shape includes rounding or beveling as depicted with respect to the actual feature 310. As shown in FIG. 5, while a top surface 302 of the desired feature 300 is planar, a corresponding top surface 312 of the actual feature 310 is nonplanar. Due to a beveling effect on the top surface 312, lateral edges 304a, 304b of the desired feature 300 have a greater length than actual lateral edges 314a, 314b of the actual feature formed by the additive manufacturing apparatus 120. The desired feature 300 can correspond to the partitions 140 between the grooves 138 (shown in FIGS. 3A and 3B). In this regard, the rounding or beveling effect on the top surface 312 can cause the polishing surface 103 defined by the partitions 140 to become nonplanar. Without being limited to any particular theory, the liquid droplets of feed material ejected onto the previously deposited layer, e.g., the liquid pad precursor material, can spread and run down the sides of the feature 300, e.g., due to wetting, resulting in the rounding.

To reduce the rounding or beveling effect, the data indicative of the desired shape can be modified. In this regard, referring back to FIG. 4, at operation 204, data indicative of a modified pattern of dispensing feed material to compensate for polishing pad distortions is generated or received. The distortions include distortions of the polishing surface 103 of the polishing pad 102. These distortions, in some cases, are caused by the additive manufacturing apparatus 120, as described herein. The modified pattern differs from the original pattern of dispensing the feed material in that the modified pattern accounts for the distortions in the actual feature 310 relative to the desired feature. In this regard, in some implementations, the data indicative of the modified pattern is determined based on relative differences between the actual feature 310 and the desired feature 300.

Figure 6:
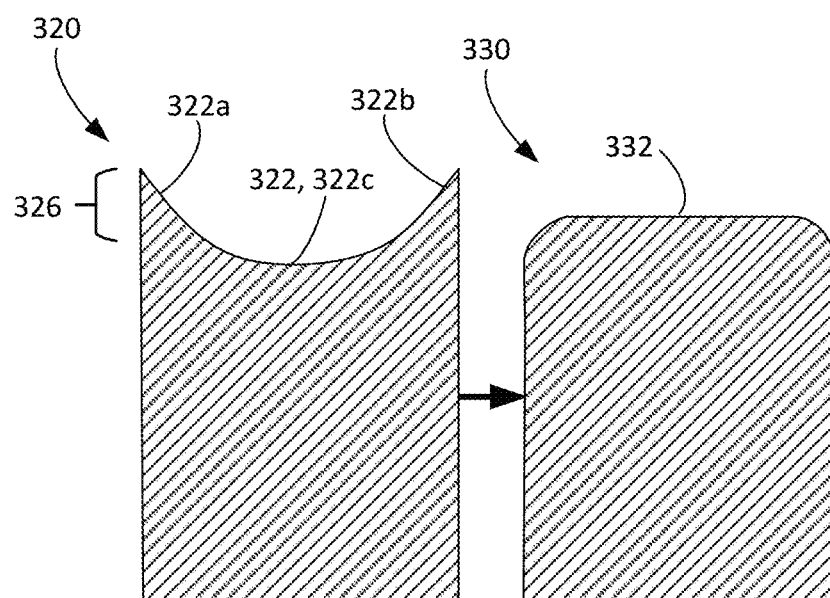
FIG. 6 illustrates an actual shape formed based on modification of the desired shape of FIG. 5.

For example, as shown in FIG. 6, the data indicative of the modified shape includes data indicative of a modified feature 320. Even though the top surface 302 of the desired feature 300 is planar, a top surface 322 of the modified feature 320 is nonplanar to compensate for the distortions of the top surface 312 of the actual feature 310 formed from the original pattern. The modified feature 320 is determined based on relative differences between the desired feature 300 and the actual feature 310. The top surface 322 of the modified feature 320 is concave to compensate for the convexity of the top surface 312 of the actual feature 310. In this regard, the data indicative of the modified shape is determined based on a combination of the data indicative of the desired shape and data indicative of the actual shape formed using the original pattern.

Referring back to FIG. 4, at operation 206, layers 130 of the feed material are dispensed by droplet ejection in accordance to a modified pattern. A resulting actual feature 330 is formed based on data indicative of the modified pattern to dispense the feed material, the modified pattern being determined based on the data indicative of the modified shape.

When the dispenser 128 is controlled to dispense the layers 130 of feed material in accordance to the data indicative of the modified pattern, a size and shape of a selected portion of the layers 130 of feed material that is cured can vary through a height of the feature. This is in contrast to the process to form the actual feature 310 in which the selected portion of cured feed material is consistent from layer to layer because the width of the desired feature 300 is consistent from layer to layer. The modified feature 320 includes a concave portion 326 having a width that varies from layer to layer. A modified pattern to dispense the feed material to form the concave portion 326 differs from the corresponding portion of the original pattern to form the top portion of the desired feature 300 in that the selected cured portions of the layers 130 of feed material for the modified pattern have varying widths and shapes. These varying widths and shapes compensate for the distortions present in the actual feature 310 such that the resulting actual feature 330 formed using the modified pattern has reduced convexity compared to the actual feature 310 formed using the original pattern. For example, a top surface 332 of the actual feature 330 has increased planarity and flatness compared to the top surface 312 of the actual feature 310. By intentionally controlling where feed material is being dispensed and cured, this correction defined by the modified pattern can better match the shape of the resulting polishing pad 102 to the original desired shape for the polishing pad 102.

For example, the controller 129 can receive a data object, e.g., a computer aided design (CAD)-compatible file that specifies the initial or intended bitmap. The data object can be stored on a non-transitory computer readable medium. The controller 129 can be programmed to generate a modified bitmap, based on the desired bitmap, that includes a feature to reduce rounding or beveling. Thus, when the polishing pad 102 is fabricated using the modified bitmap, it more closely matches the desired design.

Figure 7:
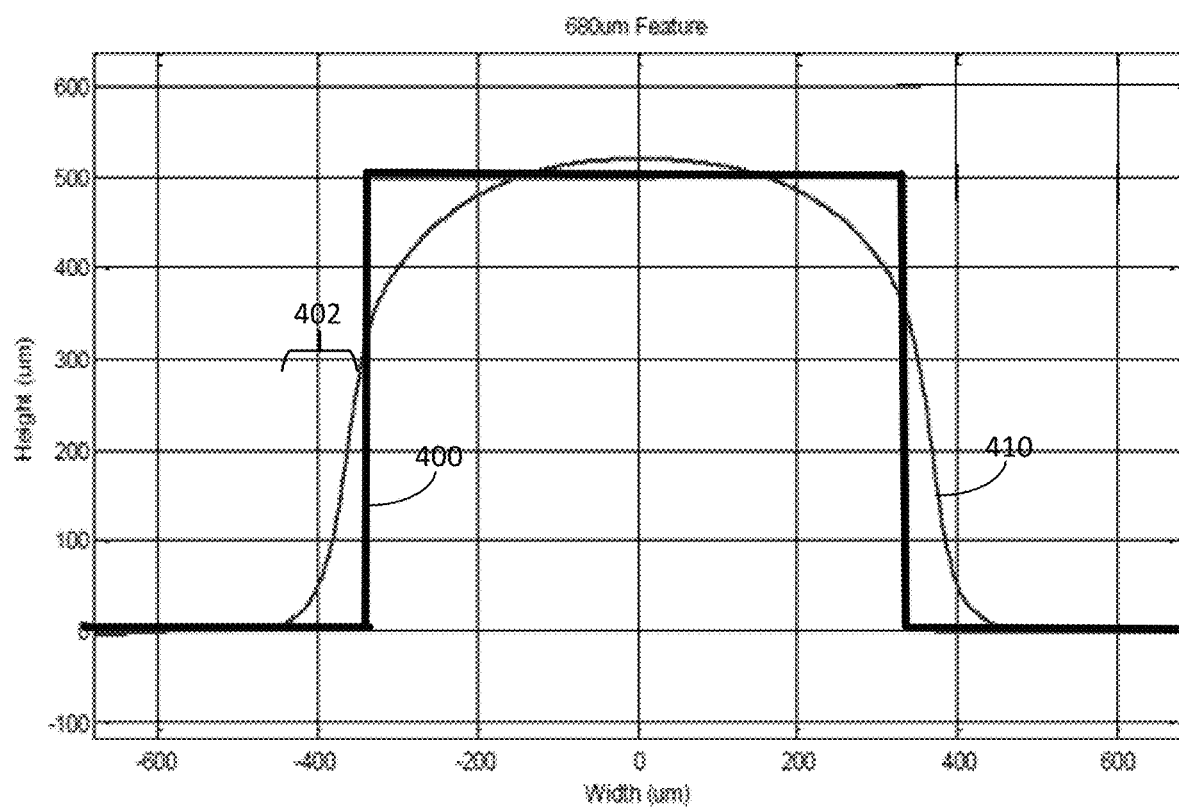
FIG. 7 illustrates another example of an actual shape formed based on a desired shape.

FIG. 7 illustrates another example of a desired feature 400 and an actual feature 410 formed based on dispensing and curing patterns determined in accordance to the data indicative of the desired feature 400. In this particular example, the desired feature 400 had a width of 680 μm and a height of 500 μm, although other dimensions are appropriate in an implemented process. As illustrated, the actual feature 410 had a non-planar top surface and slanted side walls.

The desired feature 400 is a constant width feature, e.g., the partition 140 separating the grooves 138 of the polishing pad 102. A constant width of the partitions 140 can improve wafer-to-wafer polishing uniformity. Furthermore, the polishing efficacy of the polishing pad 102 can be dependent on planarity of the polishing surface 103. Using the processes described herein, data indicative of a modified pattern can be generated so that the resulting actual feature formed using the modified pattern more closely matches the desired feature 400. In particular, the modified pattern corresponds to the original pattern with an additional correction profile determined using processes described herein. The additional correction profile compensates for the distortions of the actual feature 410 formed using the original pattern.

Figure 8A:
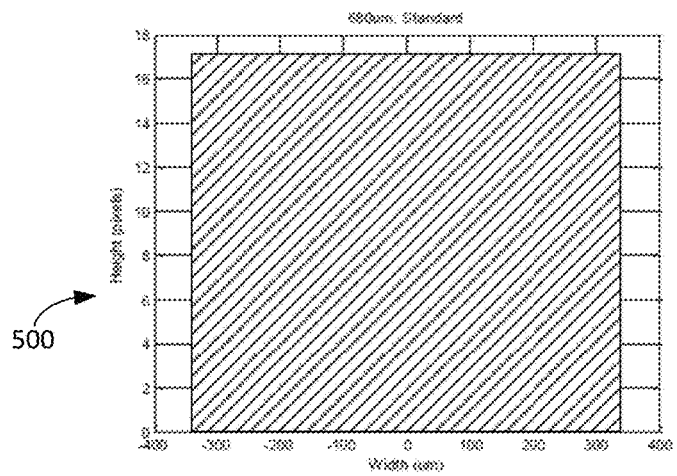
FIGS. 8A-8C are bitmap representations of patterns of feed material to be dispensed.
Figure 8B:
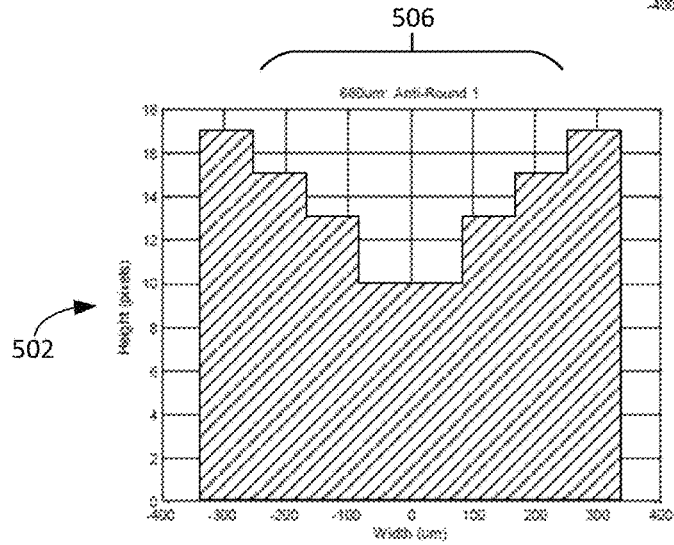
Figure 8C:
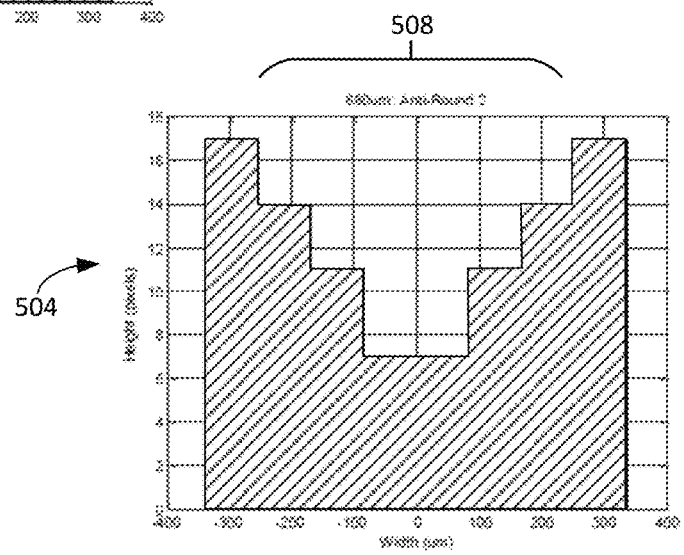

The examples of FIGS. 8A-8C are representative of data indicative of shapes used by the additive manufacturing apparatus 120 to dispense and cure the feed material. In some implementations, the data indicative of the shapes described herein include bitmap representations of the shapes to be formed or the shapes formed. Each bit of the bitmap can correspond to a voxel of a feature of the polishing pad 102 to be formed. For example, FIG. 8A illustrates a bitmap representation 500 generated based on the desired feature 400. FIG. 8B and FIG. 8C illustrate bitmap representations 502, 504 generated to compensate for distortions of the actual feature 410. The bitmap representations 502, 504 are thus representative of modified features generated based on the desired feature 400 and the actual feature 410. The bitmap representations 502, 504 include stepped portions 506, 508 to approximate concavities of the modified features that compensate for the convexity of the actual feature 410. The concavity approximated by the stepped portions 506 is less than the concavity approximated by the stepped portions 508.

Figure 9:
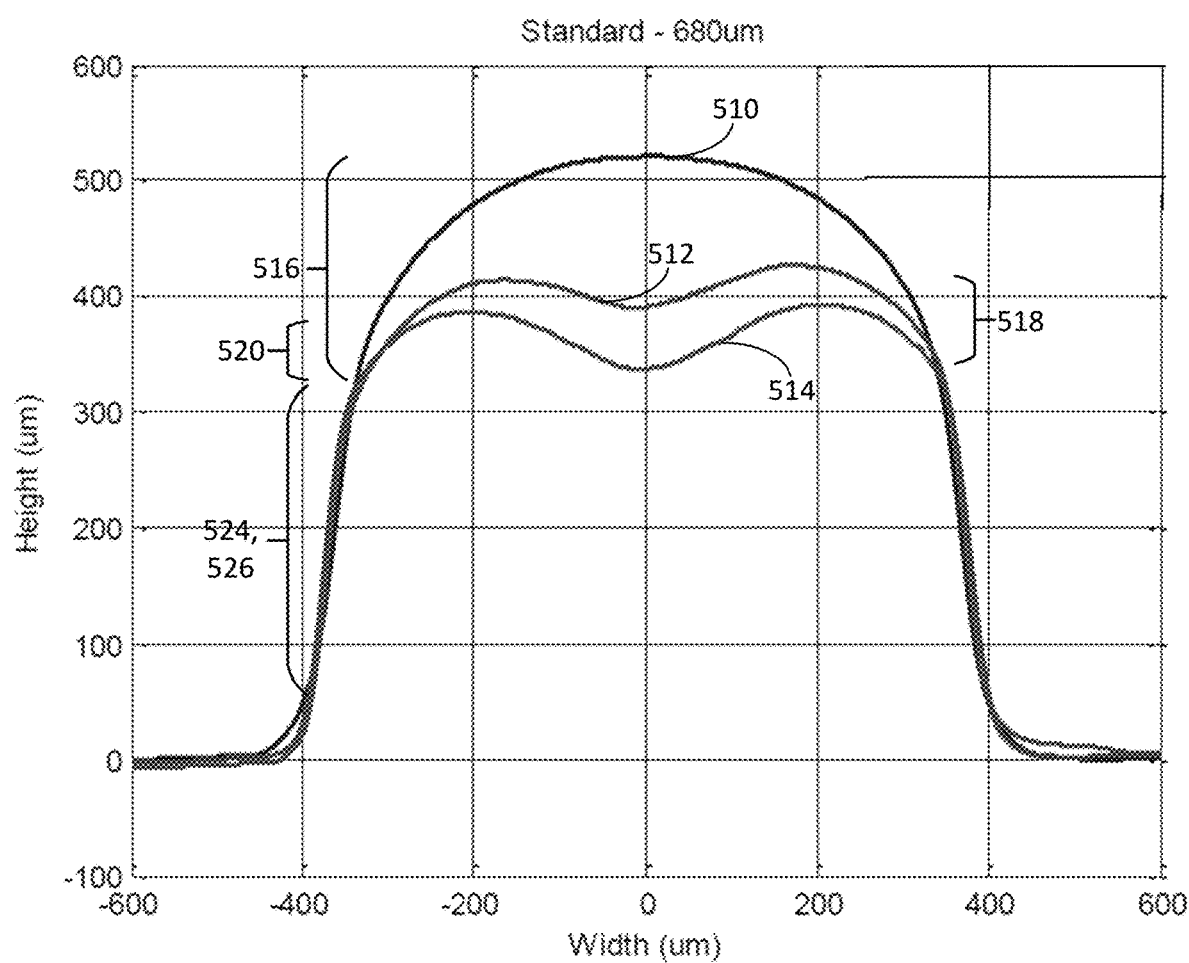
FIG. 9 illustrates resulting shapes formed using the bitmap representations of FIGS. 8A-8C.

FIG. 9 illustrates resulting actual features 510, 512, 514 formed using modified patterns generally corresponding to the bitmap representations 500, 502, 504, respectively. The actual features 510, 512, 514 include variable width portions 516, 518, 520, respectively, with the variable width portion of the actual feature 510 having the greatest height. The variable width portion 518 has a height larger than the variable width portion 520. Thus, a constant width can be more readily achieved through the bitmap representations 502, 504 that include non-constant width patterns that compensate for distortions of the actual feature 510 formed using the bitmap representation 500.

Figure 10:
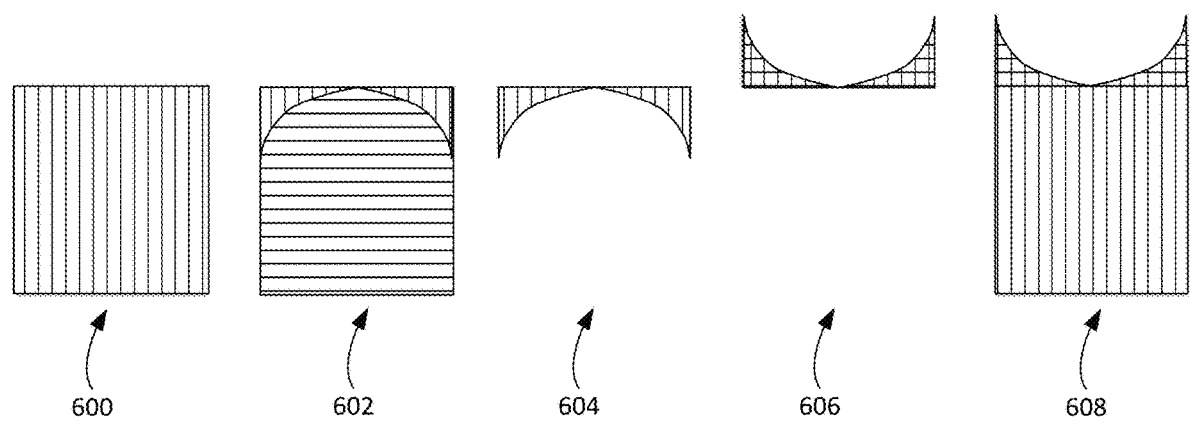
FIG. 10 depicts a process of generating data indicative of a modified shape.
Figure 11:
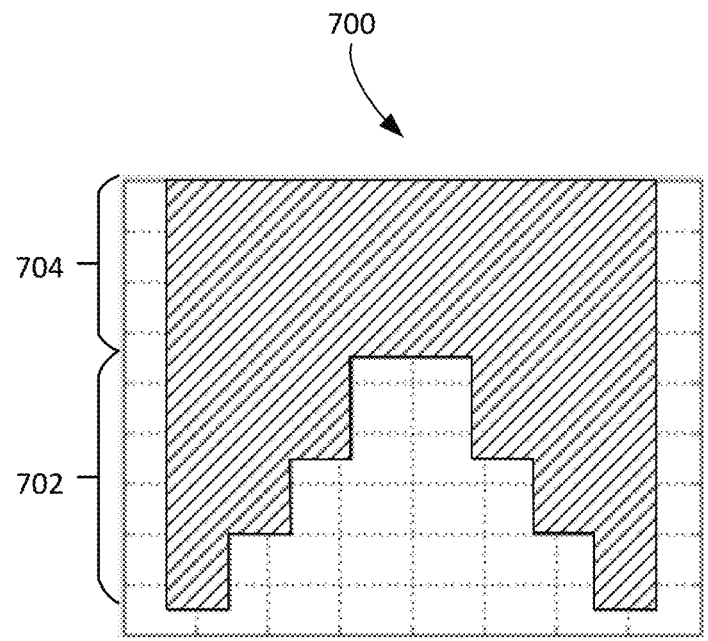
FIG. 11 is an example of a bitmap representation of a pattern of feed material to be dispensed in which an order of layers of feed material to be dispensed has been adjusted.

FIG. 10 illustrates an example process of determining a modified feature, and hence determining a modified pattern with which to dispense feed material to form a feature that better matches a desired feature. An actual shape is formed based on data representing a desired shape 600, e.g., using the additive manufacturing apparatus 120 as described herein, and then data representing a measured shape 602 of the actual shape is determined. The data representing the measured shape 602 can be determined using, for example, a confocal laser microscope to measure the height profile of the actual shape. Data representing a difference 604 between the measured shape 602 and the desired shape 600 is then determined. The difference 604 can be indicative of the distortion of the measured shape 602 relative to the desired shape 600 and/or the distortion of the actual shape relative to the desired shape 600. The difference 604 can correspond to the measured shape 602 being subtracted from the desired shape 600. The data representing the difference 604 represents, for example, the portion of the measured shape 602 that does not match with the desired shape 600.

Data representing an inverted difference 606 is determined based on the data representing the difference 604. The data representing the inverted difference 606 is complementary to the difference 604, thereby compensating for the distortion of the measured shape 602. In some implementations, the inverted difference can be scaled anywhere from 1 to 3 times to form the data representing the inverted difference 606. The inverted difference 606 corresponds to the correction profile used to modify the original desired shape 600. In this regard, the data representing the inverted difference 606 is added to the data representing the desired shape 600 to form data representing a modified shape 608. The data described in this example can correspond to bitmaps, as described herein.

The controller, e.g., the controller 129, can be implemented in digital electronic circuitry, or in computer software, firmware, or hardware, or in combinations of them. The controller can include one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The controller 129 and other computing devices part of systems described can include non-transitory computer readable medium to store a data object, e.g., a computer aided design (CAD)-compatible file that identifies the pattern in which the feed material should be formed for each layer. For example, the data object could be a STL-formatted file, a 3D Manufacturing Format (3MF) file, or an Additive Manufacturing File Format (AMF) file. For example, the controller could receive the data object from a remote computer. A processor in the controller 129, e.g., as controlled by firmware or software, can interpret the data object received from the computer to generate the set of signals necessary to control the components of the additive manufacturing apparatus 120 to deposit and/or cure each layer in the desired pattern.

A number of implementations have been described. Nevertheless, it will be understood that various modifications may be made.

Figure 12:
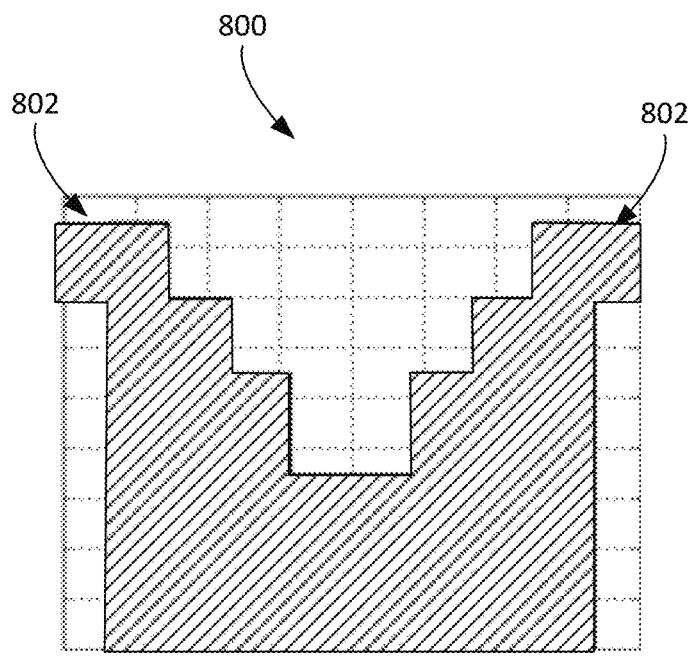
FIG. 12 is an example of a bitmap representation of a pattern of feed material to be dispensed in which a portion of the bitmap representation extends beyond an original width of a desired shape to be formed.

In some implementations, referring to FIG. 12, the correction profile includes portion extending beyond a width of the originally desired feature. A modified bitmap representation 800 includes a protruding portion 802 extending beyond a width of the bitmap representation 500 of the desired feature. The protruding portion 802 is dispensed, for example, with the uppermost layers of feed material. The layers of feed material underlying the uppermost layers of feed material may experience widening due to material roll off during dispensing. As a result, referring briefly to FIG. 7, the underlying layers of feed material define a widened portion 402 that has a width larger than the width of the desired feature. The protruding portion 802 can correspond to feed material to be dispensed on top of the widened portion 402 to compensate for the variable width of the widened portion 402 and improve the consistency of the width of the feature at the widened portion 402.

The approach shown in FIGS. 8B and 8C is to deposit one or more additional layers of feed material to compensate for the height of the feature being less than desired. For example, one or more additional layers of feed material can be deposited in regions where rounding or beveling occurs. However, alternatively or in addition, the amount of feed material deposited in a layer can compensate for the height feature being less than desired. For example, the size of droplets or the number of droplets ejected can be increased for voxels located in regions where the height of the feature is less than desired, e.g., where rounding or beveling occurs.

In some implementations, a distribution of volume of the feed material is modified depending on a location at which the droplets 124 are to be dispensed. A volume of the droplets 124 of feed material is varied during the dispensing operation. For example, referring back to FIG. 6, the volume of the droplets 124 for forming edges 322a, 322b of the feature can be less than the volume of droplets 124 for forming the interior portion 322c of the feature. The controller 129 determines the appropriate weight for forming the edges 322a, 322b and the weight for forming the interior portion 322c based on the material properties of the feed material. The dispenser 128 can dispense less feed material to minimize roll off of the feed material. As the dispenser 128 moves to form the interior portion 322c of the feature, the volume of droplets is increased. In some implementations, the volume of the droplets 124 define a gradient from the edges 322a, 322b to the center of the feature. Depending on the wetting effect of the feed material, this type of volume control can be used to modulate an amount of feed material cured when the energy source 131, if present, is operated. For example, if the energy source 131 is scanned across the support 134 to cure different portions of the dispensed feed material, drop volume control can allow for less feed material to roll off for each pass of the energy source 131 while injecting more feed material at the edges 322a, 322b of the feature to reduce the beveling effect described herein.

In some implementations, multiple types of feed material are dispensed. The additive manufacturing apparatus 120 includes, for example, two or more dispensers, each dispenser dispensing a different type of feed material. In some cases, a single dispenser, e.g., the dispenser 128, receives multiple types of feed material and dispenses a mixture of the multiple types of feed material. Because properties of a first type of feed material may vary from properties of a second type of feed material, the modification to the original pattern to dispense the first type of feed material may include a greater or smaller amount of scaling than the modification to the original pattern to dispense the second type of feed material. Alternatively, if droplet weight is controlled, the weights of the droplets of the first type of feed material can be controlled to be higher or lower than the weights of the droplets of the second type of feed material. In some cases, the size of the droplets of the first type of feed material can be controlled to be larger or smaller than the sizes of the droplets of the second type of feed material.

In some implementations, multiple types of feed material form different portions of the polishing pad 102, for example, to form the polishing layer 122 and the backing layer 136, or to form different portions of the polishing layer 122, e.g., to provide a polishing layer with polishing properties that vary laterally across the polishing surface. The second type of feed material can include the first type of feed material with an additive that alters the properties of the second type of feed material relative to the first type of feed material. The additive includes, for example, a surfactant that can adjust properties of the uncured feed material, for example, zeta potential, hydrophilicity, etc.

Thickness of each layer of the layers of feed material and size of each of the voxels may vary from implementation to implementation. In some implementations, when dispensed on the support 134, each voxel can have a width of, for example, 10 μm to 50 μm (e.g., 10 μm to 30 μm, 20 μm to 40 μm, 30 μm to 50 μm, approximately 20 μm, approximately 30 μm, or approximately 50 μm). Each layer can have a predetermined thickness. The thickness can be, for example, 1 to 80 μm, e.g., 2 to 40 μm (e.g., 2 μm to 4 μm, 5 μm to 7 μm, 10 μm to 20 μm, 25 μm to 40 μm).

Although the method and apparatus have been described in the context of fabrication of a polishing pad, the method and apparatus can be adapted for fabrication of other articles by additive manufacturing. In this case, rather than a polishing surface, there would simply be a top surface of the object being fabricated, and there would be recesses in the top surface. The modified pattern can at least partially compensate for distortions caused by the additive manufacturing system.

In addition, although the method and apparatus haves been described in the context of fabrication by droplet ejection, the method apparatus can be adapted for fabrication by other additive manufacturing techniques, e.g., selective powder dispensing followed by sintering. Accordingly, other implementations are within the scope of the claims.

What is claimed is:

1. An additive manufacturing system, comprising:
a platform to hold a polishing pad being fabricated;
a printhead to form a plurality of successive layers of the polishing pad by ejecting droplets of polishing pad precursor material onto the platform or a previously deposited and cured layer of the polishing pad;
a light source to cure the polishing pad precursor material; and
a control system configured to
receive data indicative of a desired shape of the polishing pad, the desired shape defining a profile including a planar polishing surface and one or more grooves in the polishing surface, the one or more grooves separating features with top surfaces of the features providing the planar polishing surface,
based on data indicative of a desired shape of the polishing pad and data indicative of distortions of the profile caused by the additive manufacturing system data, generate data indicative of a modified pattern of dispensing droplets of polishing pad precursor material to at least partially compensate for the distortions of the profile, wherein the modified pattern includes a nonplanar portion corresponding to the planar polishing surface, the nonplanar portion configured to at least partially compensate for distortions of the polishing surface caused by droplets of the polishing pad precursor material spreading down sides of the features,
cause the printhead to dispense a plurality of layers of the polishing pad precursor material by droplet ejection in accordance to the modified pattern, and
cause the light source to cure the plurality of layers to form the polishing pad.

2. The system of claim 1, wherein the control system is configured to apply a correction profile to the desired shape to generate a modified shape, and to generate the data indicative of the modified pattern from the modified shape.

3. The system of claim 2, wherein the control system is configured to modify data indicative of the desired shape using the data indicative of the distortions to generate data indicative of a distorted shape of the polishing pad that would occur in absence of the modified pattern.

4. The system of claim 3, wherein the control system is configured to determine the correction profile by calculating a difference between the distorted shape and the desired shape.

5. The system of claim 3, wherein the control system is configured to cause the printhead to add one or more additional layers of the polishing pad precursor material to compensate for a height of a feature in the distorted shape being less than a desired height in the desired shape.

6. The system of claim 3, wherein the control system is configured to cause the printhead to increase an amount of the polishing pad precursor material deposited per voxel to compensate for a height of a feature in the distorted shape being less than a desired height in the desired shape.

7. The system of claim 1, wherein the control system is configured to detect from the data indicative of the desired shape a presence in the desired shape of a partition separating at least two grooves.

8. The system of claim 7, wherein the control system is configured to determine a first volume of material dispensed proximate an edge portion of the partition adjacent the groove, determine a second volume of material dispensed in a central portion of the partition, and modify a distribution of volume of the material based on the first volume and the second volume such that the second volume is greater than the first volume.

9. A computer program product, tangibly embodied in a non-transitory computer readable medium, comprising instructions to cause a processor to:
receive data indicative of a desired shape of a polishing pad, the desired shape defining a profile including a planar polishing surface and one or more grooves in the polishing surface, the one or more grooves separating features with top surfaces of the features providing the planar polishing surface,
based on data indicative of a desired shape of the polishing pad and data indicative of distortions of the profile caused by an additive manufacturing system, generate data indicative of a modified pattern of dispensing droplets of polishing pad precursor material to at least partially compensate for the distortions of the profile, wherein the modified pattern includes a nonplanar portion corresponding to the planar polishing surface, the nonplanar portion configured to at least partially compensate for distortions of the polishing surface caused by droplets of the polishing pad precursor material spreading down sides of the features, and
cause a printhead to dispense a plurality of layers of a polishing pad precursor material by droplet ejection in accordance to the modified pattern.

10. The computer program product of claim 9, comprising instructions to apply a correction profile to the desired shape to generate a modified shape, and to generate the data indicative of the modified pattern from the modified shape.

11. The computer program product of claim 10, comprising instructions to modify data indicative of the desired shape using the data indicative of the distortions to generate data indicative of a distorted shape of the polishing pad that would occur in absence of the modified pattern.

12. The computer program product of claim 11, comprising instructions to determine the correction profile by calculating a difference between the distorted shape and the desired shape.

13. The computer program product of claim 11, comprising instructions to cause the printhead to add one or more additional layers of the polishing pad precursor material to compensate for a height of a feature in the distorted shape being less than a desired height in the desired shape.

14. The computer program product of claim 11, comprising instructions to cause the printhead to increase an amount of the polishing pad precursor material deposited per voxel to compensate for a height of a feature in the distorted shape being less than a desired height in the desired shape.

15. A method of fabricating a polishing pad using an additive manufacturing system, the method comprising:
receiving data indicative of a desired shape of the polishing pad, the desired shape defining a profile including a planar polishing surface and one or more grooves in the polishing surface, the one or more grooves separating features with top surfaces of the features providing the planar polishing surface, based on data indicative of a desired shape of the polishing pad and data indicative of distortions of the profile caused by the additive manufacturing system data, generating data indicative of a modified pattern of dispensing droplets of polishing pad precursor material to at least partially compensate for the distortions of the profile, wherein the modified pattern includes a nonplanar portion corresponding to the planar polishing surface, the nonplanar portion configured to at least partially compensate for distortions of the polishing surface caused by droplets of the polishing pad precursor material spreading down sides of the features, and dispensing a plurality of layers of the polishing pad precursor material by droplet ejection in accordance to the modified pattern, and curing the plurality of layers to form the polishing pad.

16. The method of claim 15, comprising applying a correction profile to the desired shape to generate a modified shape, and generating the data indicative of the modified pattern from the modified shape.

17. The method of claim 16, comprising modifying data indicative of the desired shape using the data indicative of the distortions to generate data indicative of a distorted shape of the polishing pad that would occur in absence of the modified pattern.

18. The method of claim 17, comprising determining the correction profile by calculating a difference between the distorted shape and the desired shape.

19. The method of claim 17, comprising adding one or more additional layers of the polishing pad precursor material to compensate for a height of a feature in the distorted shape being less than a desired height in the desired shape.

20. The method of claim 17, comprising increasing an amount of the polishing pad precursor material deposited per voxel to compensate for a height of a feature in the distorted shape being less than a desired height in the desired shape.

* * * * *